2,954,870

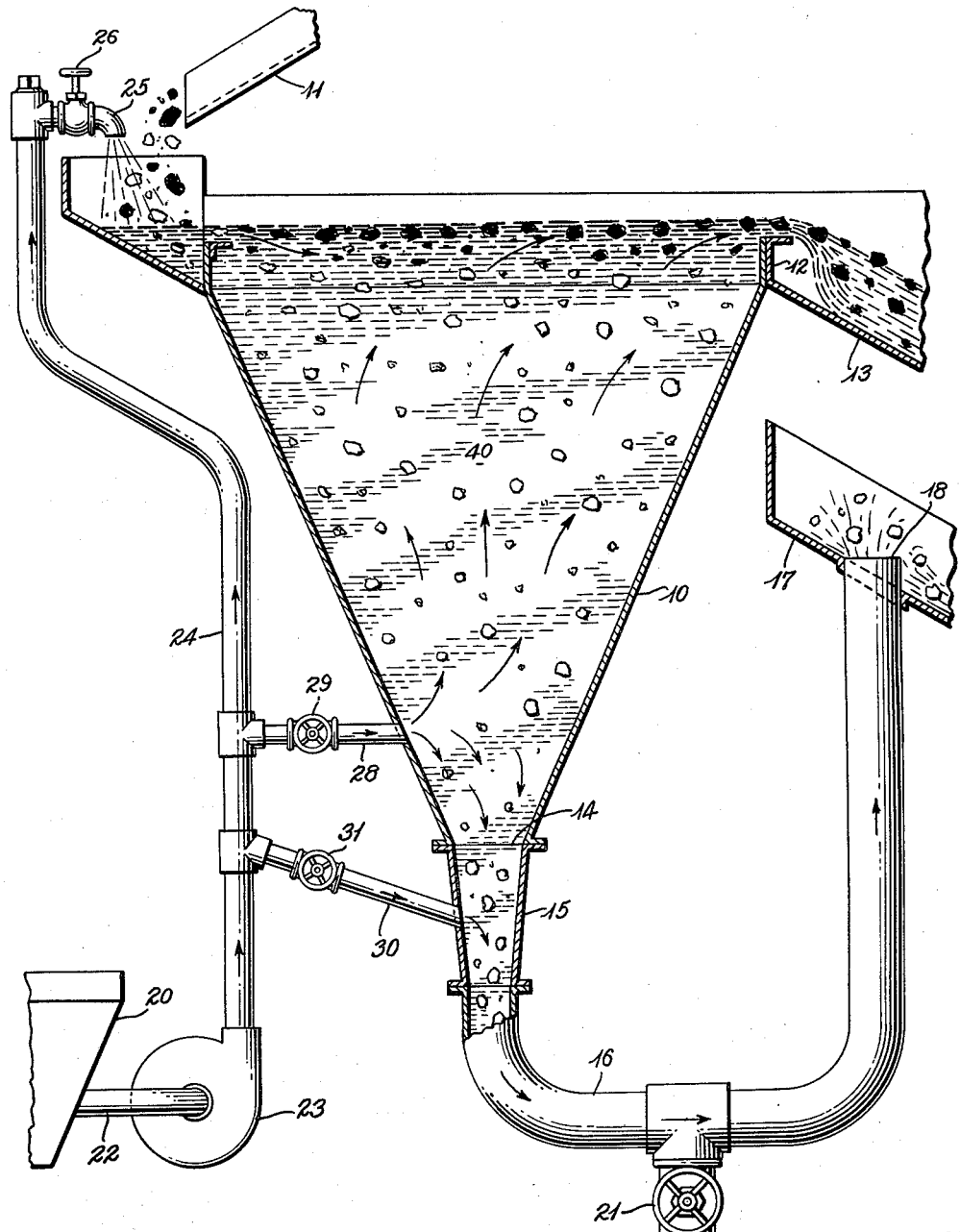

SEPARATION OF SOLIDS

Joseph Ross Pagnotti, Old Forge, Pa., and Samuel Barron, West Long Branch, N.J., assignors to Mineral Processing Corporation, Dover, Del., a corporation of Delaware Filed Oct. 22, 1957, Ser. No. 691,570

4 Claims. (Cl. 209—172.5)

This invention relates to an improved method and apparatus for separating solids having different specific gravities. More specifically, this invention relates to a novel apparatus and the method of its application to a continuously operating process whereby an efficient separation of solids of different specific gravities and of a wide size range can be effected. The size range may be all or part of 6″ x ¼″ and of a variable distribution.

Present gravity medium processes have proven of benefit for the separation of particles of different specific gravities for sizes larger than ¼″. In all of these processes, particles of different specific gravities are immersed in a gravity or heavy medium having a specific gravity higher than that of the light fraction and lower than that of the heavy fraction. The separation is effected by the tendency of the lighter particles to float and the heavier particles to sink.

In practice, the heavy medium is prepared by making a suspension of comminuted solids of high specific gravity in water. This suspension is substantially self sustaining with agitation. It is essential, however, not only to maintain the specific gravity of the medium uniform and constant, but also to introduce the feed, and discharge the sink and float fractions without interference with the fluid flow conditions. These are prerequisite to the maintaining of optimum operating conditions.

To meet these demands, a number of types of separatory vessels are in use. These are equipped with many mechanical devices such as agitators, sweeps, screws, chain and flight conveyors, buckets, drags and rakes. By these devices, many problems are solved, but often new difficulties are introduced.

Where the feed comprises a proportion of solids of nearly equal specific gravities such as is the case with anthracite coal, the eddy currents generated by these devices cause particles of a specific gravity somewhat higher than the specific gravity of separation to float with the lighter particles, and particles of a specific gravity somewhat lower than the specific gravity of separation to sink with the heavier particles, in either case impairing the efficiency of the separation.

Where the feed comprises a considerable proportion of the larger sizes, and includes solids of 5 or 6 inch diameters, operational difficulties arise, often to the point at which the efficiency is so impaired that the process is no longer of practical use. For example, in processes using a separatory vessel of the cone type, the removal of the sink fraction from the bottom through the necessarily large size conduit by means of an air lift, for example, requires the use of excessive and impractical amounts of air. The use of an elevator under these conditions often presents mechanical difficulties. More important, the fluid flow conditions in the separatory vessel may be so affected that a satisfactory separation is impossible. In other types of separatory vessels, equipped with drags, screws, rakes, etc., the fluid flow conditions are also affected and a satisfactory separation cannot be made.

It will be observed that in all of these processes many and diverse mechanical devices are employed to produce and maintain the conditions necessary for an efficient separation, but which are found wanting in the presence of a feed of wide size range or a feed which includes very large sizes.

Quite obviously, there is a need for a method and an apparatus that will provide a means for the treatment of particles of a wide size range, including a proportion of large pieces up to 6″ in diameter, that will be efficient and economic and will not be subject to these difficulties.

It is the purpose of this invention to provide just such an apparatus and method that will satisfy this need for a means to separate solids of different specific gravities, of very wide size range and avoid the various difficulties and limitations in other processes.

By the present invention, such an apparatus is furnished. A method is here disclosed which preferably makes use of an aqueous suspension of a heavy media of magnetic permeability, and which functions without the use of any mechanical devices to maintain the uniformity of the specific gravity of the medium, to remove the float fraction, or to remove the sink fraction from the separatory vessel.

Although this invention is especially well adapted to a process wherein the medium comprises a finely divided suspension of magnetically permeable solids such as magnetite or ferrosilicon, it is also applicable to a process wherein the medium may be a true liquid such as an aqueous salt solution of zinc chloride or calcium chloride or a heavy organic liquid such as tetrabromethane ($C_2H_2Br_4$), or bromoform ($CHBr_3$).

When a medium of the suspension type is used, it is necessary that the specific gravity of the medium be maintained uniform. Although this may be accomplished by the use of mechanical devices or by inducing an upward current of the medium, the latter is much superior since mechanical agitation often introduces eddy currents and other disturbances into the bath. The velocity of the upward current used should be less than the sink rate of the heavier fraction and greater than the sink rate of the media solids.

The preferred separatory vessel is the conventional cone, provided with a wier to take the overflow at the top of the cone, a means of introducing medium to impart an upward current in the cone and to remove hydraulically the sink particles.

The features of this invention are:

(1) The provision of an efficient and economic process for the separation of solids of different specific gravities, having a wide size range, including a proportion of solids as large as 6″ in diameter.

(2) The provision of a method and apparatus in which the separation can be made using a liquid suspension of heavy media.

(3) The provision of an apparatus from which the light and heavy fractions are removed hydraulically.

(4) The provision of a means of discharging the sink fraction without affecting fluid flow conditions in the separator.

(5) The provision of a non-mechanical means of maintaining a uniform specific gravity of the medium.

Other and further objects of the invention will become apparent from the following detailed description when taken with the sole figure of the drawing which shows schematically the apparatus of the present invention.

Before referring to the drawing and setting forth a detailed description, the invention will first be described in general terms. The apparatus for this discussion will be the preferred separatory vessel commonly known as a cone.

The method of operation comprises the following steps in combination. A mixture of coarse particles, having a wide size range, and a heavy medium of the desired specific gravity is introduced into a cone at a point on the periphery at the surface of a fluid mass of heavy medium (finely divided solids in aqueous suspension). The fluid mass or bath is maintained in a substantially quiescent state and at a uniform specific gravity. Medium is also introduced into the cone at two additional points: (1) at the throat of the cone above the apex discharge point to impart a slight upward movement of the medium in order to maintain the specific gravity uniform, and to transport hydraulically the sink particles into a receptacle which connects the apex of the cone to the discharge conduit, and (2) into the aforementioned receptacle to transport hydraulically the sink particles through the discharge conduit. The flow through this discharge conduit is produced by the pressure head developed by the difference in elevation between the surface of the medium and the point of discharge.

The light fraction and medium are removed by overflowing a wier at the top of the cone at a point on the periphery opposite the feed. The heavy fraction and medium are discharged from the apex of the cone, through the conduit into a chute. The float and sink fractions are passed to other steps of the recovery process to recover and reclaim the heavy medium, but they form no part of this invention.

In the above description, the fluid bath has been described as an aqueous suspension of finely divided solids. In practice, the fluid bath is usually an aqueous suspension of magnetically permeable particles which are substantially self sustaining. Heretofore, the medium bath has been maintained at a uniform specific gravity throughout by mechanical agitation. In the present invention, agitation of this type would destroy the fluid flow conditions.

The sole figure of the drawings is a schematic representation of the separatory vessel showing in detail the novel features. Referring now to the figure, the invention will be described in terms of a preferred embodiment.

The separatory vessel comprises a conventional cone 10 provided with a chute 11 for introducing the feed at one side of the cone, at the periphery, at or adjacent to the surface of the contained bath. A wier 12 is provided opposite the point of feed for discharging the float fraction into a launder or chute 13 for further processing. At the apex of the cone 10 is a relatively large opening 14 to which is connected a receptacle 15 in the shape of a frustum of a circular cone, the lower end of which is connected to a conduit 16.

This discharge conduit 16 is in the shape of a long sweep U reversing the direction of the downwardly flowing discharge and carrying it upwardly to an elevation which will produce a velocity of the discharge in the conduit that will maintain the largest and heaviest particles in suspension. A chute 17 cooperates with the terminus of conduit 16 to receive and carry away the discharge or sink.

The critical velocity increases with increase in size of the largest particle to be removed. Thus, the elevation of the point of free discharge designated in the drawing by the numeral 18, is governed by the size of the largest particles in the discharge and may be predetermined.

The receptacle 15 is an essential element. The diameter of its upper opening and that of the apex opening of cone 10 must be at least three times the longest dimension of the largest particles to avoid possible arching and consequent blockage of the flow. The diameter of the conduit 16 and the lower opening of receptacle 15 must be at least twice the longest dimension of the largest particles to permit ready flow. The length of the receptacle 15 should be equal to at least six times the diameter of the largest sink particle. The conduit discharges the sink fraction into chute or launder 17 for further processing to separate the sink from the heavy medium so that it can be circulated to a suitable sump or storage container 20 for reuse. A valve 21 is provided for draining and cleaning purposes only.

The sump 20 is connected by conduit 22 to the inlet of pump 23. Conduit 24 connects the discharge of pump 23 with the top of cone 10. A short conduit 25 provided with a control valve 26 empties into the top of cone 10 at about the same point as the feed from chute 11. A branch conduit 28, provided with control valve 29, is connected from conduit 24 to a point adjacent the apex of cone 10. A second branch conduit 30, provided with control valve 31 is connected from conduit 24 to receptacle 15. The heavy medium contained in sump 20 is thus pumped to the top of cone 10, to a point adjacent the apex of cone 10, and to receptacle 15.

For ease of description, the method of operation will be explained as applied to the separation of anthracite coal, having a specific gravity less than 1.65 from a refuse having a somewhat higher specific gravity. The size range is $-3\frac{1}{4}''$ x $+1\frac{3}{16}''$. The media solids will be regarded as magnetically permeable magnetite having a specific gravity of 5. Despite the specific references, it is not the intent to limit the invention to the separation of coal from its refuse, nor to the use of magnetite. The selection of these materials is strictly by way of illustration and not for the purpose of restriction or limitation.

A feed comprising anthracite coal and refuse of a size range $-3\frac{1}{4}''$ x $+1\frac{3}{16}''$, for example, is introduced via chute 11 together with a heavy medium via conduit 25 at or adjacent to the surface of the substantially quiescent medium bath 40 contained in cone 10. The heavy medium is prepared with a liquid (water) to solids (magnetite) ratio that will yield a specific gravity of 1.65. The particles of coal of a specific gravity less than 1.65 float and are discharged from the cone separator over the wier 12 in the usual manner.

A special technique, however, is used to remove the refuse particles from the separatory cone 10. The refuse flows through the relatively large discharge opening 14 of the cone into the receptacle 15 and then through the conduit 16 discharging into a chute or launder 17 by means of medium injected into the cone 10 via conduit 28 and into the receptacle 15 via conduit 30. The quantity of medium introduced into the cone is such that an upward movement of the medium occurs in the zone above to maintain a uniform gravity of the medium and a downward movement occurs in the zone below to prevent the accumulation of refuse, "crowding," and to carry the sink material into the receptacle 15. The additional quantity of medium introduced into the receptacle 15 furnishes the volume of medium required to provide the velocity necessary to maintain the largest particles in suspension in the discharge conduit 16 without disturbing the fluid flow conditions in the cone 10.

The sink product (refuse) is discharged into the chute or launder 17 for further processing or waste.

Although the additional quantity of fluid introduced into the receptacle 15 to furnish the necessary volume is shown as circulating medium, another liquid, such as water, may here be used, because this liquid does not take part in the separation.

From the above description, it will be apparent that this apparatus and the method of its application furnishes a novel device and method for the removal of the sink material from the separatory vessel and provides for maintaining the fluid flow conditions for the efficient and economic separation of particles of different specific gravities and of a wide range of sizes, including very large particles. It will further be observed, that the cycle of flow is so rapid that at no time is there a departure from optimum operating conditions.

In the anthracite industry, it is sometimes desirable to subject the refuse from the separation to a second separation at a higher specific gravity in order to recover valuable coal products from intermediate gravity material which in the first separation sank with the refuse. This intermediate gravity material usually consists of particles which are part coal and part refuse. If these intermediate gravity particles are separated from the heavy refuse particles and then subjected to a grinding process, the valuable coal portion is broken away from the refuse portion and may be recovered by mixing with the raw feed to the first separation.

The following specific example of the recovery of this intermediate gravity material will illustrate the operation of the process. Refuse material of a size range —4″ x +5/16″ is fed by means of a chute into an 8 foot separatory cone at the rate of 100 net tons per hour or its liquid equivalent of 300 gallons per minute. Medium of a specific gravity of 1.75 which has been circulating through the system for about five minutes is now delivered to the same chute at the rate of 300 gallons per minute and the mixture of refuse material and medium is discharged into the medium bath at the surface. Medium of the same specific gravity is introduced into the lower section of the cone at the rate of 500 gallons per minute imparting an upward movement to the bath, and carrying the sink material downwardly into a receptacle designed in accordance with the principles laid down for the design of receptacle 15. Additional medium in the amount of 600 gallons per minute is introduced into the receptacle to transport the heavy refuse through a U-shaped discharge conduit to a discharge point spaced slightly below the level of the bath in the cone. By this means a velocity of 7 feet per second is imparted to the sink fraction flowing through the discharge conduit. This velocity is required to maintain the large particles in suspension.

The light fraction (intermediate material) and medium overflows the wier at the top of the cone at the rate of 50 tons per hour, then is subjected to a washing and screening operation, followed by a grinding operation. The ground product is then mixed with the raw feed and sent to the coal separator.

The heavy fraction and medium is discharged from the U-shaped discharge conduit and then subjected to a washing and screening operation to recover the medium and finally sent to waste.

From the foregoing, it will be apparent that the present invention possesses a number of important advantages. It permits the processing of a feed of wide size range and very large particle size in a very efficient and economic manner. It employs no mechanical devices to remove the float and sink products or to maintain uniformity of gravity. It permits of easy control.

The above described preferred separatory vessel and method of its application is novel. It is not, however, the intent to limit this invention to its use. Other type separatory vessels employing the same principles may be used.

Although the present invention has been shown and described with reference to a preferred embodiment, nevertheless, various changes and modifications such as are obvious to one skilled in the art and which do not depart from the spirit, scope, and contemplation of the inventive thought herein embodied, are deemed to fall within the boundaries of the invention.

What is claimed is:

1. A float and sink process for separating a mixture of solids of different specific gravities and of a wide size range into a light fraction and a heavy fraction of said mixture, using a relatively quiescent bath containing a heavy medium and having a gravity substantially equal to the gravity of separation, comprising the steps of introducing into the top of said bath a mixture of said solids together with a quantity of medium sufficient to carry the light fraction across the top of said bath, withdrawing the light fraction and medium from the top of said bath, withdrawing the heavy fraction and medium from the bottom of said bath in the form of a stream, said stream being directed downwardly from the bottom of said bath and then upwardly to a free discharge point located in elevation above the bottom and below the top of said bath, the difference in elevation between said discharge point and the top of said bath being such as to produce a resultant minimum stream velocity capable of carrying all of the solids including the largest sized solids in said stream to said discharge point, introducing a sufficient quantity of medium into said bath at a level above the bottom thereof to establish a slight upward movement of the bath from said level thereby maintaining the specific gravity of the bath uniform without destroying the relatively quiescent condition of the bath and also to convey the heavy fraction to the bottom of said bath, introducing fluid into said stream below the bottom of said bath and in a sufficient quantity to satisfy the volume requirements of said stream at said resultant stream velocity without disturbing the conditions of said bath.

2. A float and sink process for separating a mixture of solids of different specific gravities and of a wide size range into a light fraction and a heavy fraction of said mixture, using a relatively quiescent bath containing a heavy medium and having a gravity substantially equal to the gravity of separation, comprising the steps of introducing into the top of said bath a mixture of said solids having a particle size greater than about ¼″ and less than about 6″ together with a first quantity of medium sufficient to carry the light fraction across the top of said bath, withdrawing the light fraction and medium from the top of said bath, withdrawing the heavy fraction and medium from the bottom of said bath in the form of a stream, said stream being directed downwardly from the bottom of said bath and then upwardly to a free discharge point located in elevation above the bottom and below the top of said bath, the difference in elevation between said discharge point and the top of said bath being such as to produce a resultant minimum stream velocity capable of carrying all of the solids including the largest sized solids in said stream to said discharge point, introducing a second quantity of medium into said bath at a level above the bottom thereof in sufficient amount to establish a slight upward movement of the bath from said level thereby maintaining the specific gravity of the bath uniform without destroying the relatively quiescent condition of the bath and also to convey the heavy fraction to the bottom of said bath, introducing a third quantity of medium into said stream below the bottom of said bath and in a sufficient amount to satisfy the volume requirements of said stream at said resultant stream velocity without disturbing the conditions of said bath.

3. A float and sink process for separating a mixture of solids of different specific gravities and of a wide size range into a light fraction and a heavy fraction of said mixture, using a relatively quiescent bath containing a heavy medium and having a gravity substantially equal to the gravity of separation, comprising the steps of introducing into the top of said bath a mixture of said solids having a particle size greater than about ¼″ and less than about 6″ together with a first quantity of medium sufficient to carry the light fraction across the top of said bath, withdrawing the light fraction and medium from the top of said bath, withdrawing the heavy fraction and medium from the bottom of said bath in the form of a stream having a diameter equal to at least three times the diameter of the largest sized solids in said stream, reducing said stream to a diameter of at least twice the diameter of said largest sized solids over a distance equal to at least six times the diameter of said largest sized solids, said stream being directed downwardly from the bottom of said bath and then upwardly to a free discharge point located in elevation above the bottom and below the top of said bath, the difference in elevation between said discharge point and the top of said bath being such as to produce a resultant minimum stream velocity capable of carrying all of the solids including said largest sized solids in said stream to said discharge point, introducing a second quantity of medium into said bath at a level above the bottom thereof in sufficient amount to establish a slight upward movement of the bath from said level thereby maintaining the specific gravity of the bath uniform without destroying the relatively quiescent condition of the bath and also to convey the heavy fraction to the bottom of said bath, introducing a third quantity of medium into said stream below the bottom of said bath and in a sufficient amount to satisfy the volume requirements of said stream at said resultant stream velocity without disturbing the conditions of said bath.

4. Float and sink apparatus for separating a mixture of solids of different specific gravities and of a wide size range into a light fraction and a heavy fraction of said mixture, using a relatively quiescent bath containing a heavy medium and having a gravity substantially equal to the gravity of separation, comprising a separating cone filled with said bath and having an open apex at the lower end of said cone, means for introducing into the top of said cone a mixture of said solids having a particle size greater than about ¼" and less than about 6" together with a first quantity of medium sufficient to carry the light fraction across the top of said bath, means for withdrawing the light fraction and medium from the top of said cone, a frusto-conical receptacle communicating with the open apex at the bottom of said cone for withdrawing the heavy fraction and medium from the bottom of said cone in the form of a stream, the upper end of said frusto-conical receptacle at its point of connection with the apex of said cone having an opening whose diameter is equal to at least three times the diameter of the largest sized solids in said stream, the lower end of said frusto-conical receptacle having an opening whose diameter is equal to at least twice the diameter of said largest sized solids, the vertical length of said frusto-conical receptacle being equal to at least six times the diameter of said largest size solids, a U-shaped conduit connected at one end to the lower opening of said frusto-conical receptacle and terminating at its other end in a free discharge point located in elevation above the bottom and below the top of said cone, the diameter of said U-shaped conduit being substantially equal to that of the lower opening of said frusto-conical receptacle, said stream passing from said bath through said frusto-conical receptacle through said U-shaped conduit to said point of free discharge, the difference in elevation between said other end of said U-shaped conduit and the top of said cone being such as to produce a resultant minimum stream velocity capable of carrying all of the solids including said largest sized solids in said stream to said discharge point, means for introducing a second quantity of medium into said bath at a level above the bottom of said cone in sufficient amount to establish a slight upward movement of the bath from said level, thereby maintaining the specific gravity of the bath uniform without destroying the relatively quiescent condition thereof, and also to convey the heavy fraction to the bottom of said cone, and means for introducing a third quantity of medium into said frusto-conical receptacle and in a sufficient amount to satisfy the volume requirements of said stream at said resultant stream velocity without disturbing the conditions of said bath.

References Cited in the file of this patent
UNITED STATES PATENTS

| | | |
|---|---|---|
| 2,474,774 | Bean | June 28, 1949 |
| 2,726,768 | Rakowsky | Dec. 13, 1955 |